UNITED STATES PATENT OFFICE 2,316,585

PAINT COMPOSITION

Leslie James Howlett, Lindfield, and Wesley Henry Howlett, Gordon, New South Wales, Australia No Drawing. Application January 29, 1941, Serial No. 376,522. In Australia May 25, 1940

5 Claims. (Cl. 106—95)

Hitherto attempts have been made to mix cement with oil and other ingredients commonly used in the manufacture of paint, but so far as is known none of these attempts have succeeded in retaining the cement in suspension for a very lengthy period.

The main object of this invention is to provide a method and means whereby cement may be mixed with oil in such a manner that it will be held in suspension in such oil for a very long period, thus providing a means whereby cement may be incorporated with other ingredients used in the manufacture of paints, or with tar or bitumen, in each case forming a liquid or semi-liquid product.

The cement referred to throughout this specification and in the appended claims is any one of the four types of Portland cement known as grey Portland Cement, white Portland cement, rapid hardening Portland cement, and low heat Portland cement, but it should be understood that any other cement having approximately the same constituents in approximately the same proportions as any one of these types may be used.

It should be noted, however, that whilst white lead could be included as an ingredient in the practical application of the invention, its use is not recommended as it has been found to produce unfavourable results. These unfavourable results have been found to be avoided where zinc oxide is used in place of white lead in the paints made according to this invention.

It is a further object of this invention to mix cement with oil in such a manner that when that mixture is mixed with other ingredients commonly used in the manufacture of oil paints, or with tar or bitumen, a limited quantity of water may be added and thoroughly mixed therewith immediately before use.

Broadly speaking, the invention consists of the mixture of cement, oil, and magnesium carbonate, and whilst a mixture of these ingredients in proper proportions will result in a liquid or semi-liquid compound wherein the cement will remain in suspension for a lengthy period, the addition of a small quantity of diatomaceous earth (or) alternatively zinc oxide will result in all the ingredients remaining in suspension in the oil for a much more lengthy period.

In the following statements of various applications of the invention the cement referred to is ordinary commercial grey or white Portland cement.

The proportions of the ingredients which have been found to give the most satisfactory results are as follows:

No. 1

| | Ounces |
|---|---|
| Cement | 24 |
| Oil (preferably raw linseed) | 14 |
| Magnesium carbonate | 2 |
| Diatomaceous earth | 1 |

The preferred method of mixing these ingredients is as follows:

The cement, magnesium carbonate and diatomaceous earth are thoroughly mixed together and passed through a fine sieve, when the oil is added and the whole of the ingredients thoroughly mixed together.

If diatomaceous earth is not used the remaining ingredients may be used in the proportions stated.

This mixture may be used immediately as a paint or it may be placed in preferably airtight containers and kept until required for use. If necessary additional oil may be added for thinning but a quantity of water, not exceeding 25% of the volume of the original oil, may be added and thoroughly mixed with the mixture immediately before using.

In the practical application of the invention the ingredients hereinbefore mentioned can, however, be incorporated during the process of manufacture with terebene as a drier, and in that case the following formulas are given as examples:

No. 2

24 ozs. cement (grey Portland),
1 oz. diatomaceous earth,
2 ozs. magnesium carbonate,
14 ozs. raw linseed oil (fluid),
2 ozs. terebene (fluid).

No. 3

16 ozs. cement (grey Portland) ] or 24 ozs. white
8 ozs. white cement (Portland) [ Portland cement
2 ozs. magnesium carbonate,
1 oz. diatomaceous earth,
14 ozs. raw linseed oil (fluid)
2 ozs. terebene (fluid).

No. 4

12 ozs. cement, grey or white
12 ozs. zinc oxide, ground in oil,
2 ozs. magnesium carbonate,
14 ozs. oil (fluid),
2 ozs. terebene (fluid).

The last mentioned formula can be varied by altering the relative proportions of cement and zinc oxide but so as not to increase the proportion of cement and zinc oxide combined.

The effect of the magnesium carbonate is that it causes the cement to remain in suspension in the oil for a considerable period, but the addition of the diatomaceous earth or zinc oxide will considerably extend the period of suspension.

No. 2 mixture will be mixed in a similar manner to No. 1 mixture, but the terebene will preferably be added to the oil before the latter is mixed with the other ingredients.

No. 3 mixture will be similarly mixed, i. e. the dry ingredients will be mixed together and the oil and terebene will be mixed together and added to and thoroughly mixed with the other mixed ingredients.

No. 4 mixture may be mixed by adding and thoroughly mixing the magnesium carbonate with the cement and the terebene with the oil. The oil mixture will then be mixed thoroughly with the zinc oxide and this mixture will then be added to and thoroughly mixed with the cement and magnesium carbonate mixture. The mixture should then be strained and it will be ready for use.

Whilst diatomaceous earth has been specified as an ingredient in Nos. 1, 2 and 3 mixtures it is absent from No. 4 mixture and it will be noted that zinc oxide is used instead of the diatomaceous earth.

Dry zinc oxide may be used but it will not be as efficient as zinc oxide ground in oil.

Any suitable colouring matter or stainers may be incorporated with cement paint or cement and zinc oxide paints prepared according to this invention.

As previously stated cement may be mixed with bitumen to form a paint according to this invention and the following formula is given as an example:

| | Ounces |
|---|---|
| Black bitumen, preferably 120° to 140° M. P. | 12 |
| Cement | 12 |
| Raw linseed oil (fluid) | 12 |
| Tung oil (fluid) | 4 |
| Mineral turpentine (fluid) | 1 |
| Terebene (fluid) | 2 |
| Magnesium carbonate | 2 |

The preferred method of mixing these ingredients is as follows:

(1) Dissolve, by heating, the bitumen in linseed oil and allow to cool. Mix the tung oil, terebene and mineral turpentine together and add to bitumen-oil mixture; (2) Mix cement and magnesium carbonate together, pass through fine sieve, then stir in the bitumen mixture and thoroughly mix, and finally strain the mixture. The bitumen-oil must not be added to the cement mixture whilst it is hot.

It will be noted that in the above formula tung oil and mineral turpentine are constituent parts. These should not be used, where the mixture is not required for immediate use, except where bitumen is also used, because their effect without bitumen is to cause undue drying and precipitation or other undesirable results.

When thoroughly dry and hard these bitumen cement paints may have linseed oil paints applied over them without discolouration or bleeding.

Bitumen-cement and zinc-cement paints made according to this invention may be mixed together provided the proportion of magnesium carbonate is maintained.

Dark colours only may be made by using black bitumen, but light colours may be made by using albino bitumen or white cement.

If required water may be added to any of these bitumen cement paints up to 25% of the volume of the oil stated in the formula.

In the last formula bitumen may be replaced by an equal quantity of tar. It is not desirable, however, to use tar instead of bitumen where it is desired to apply a surface coat of other paint.

We claim:

1. A paint composition comprising an intimate mixture of Portland cement, linseed oil, and a suspension medium consisting of magnesium carbonate, said Portland cement and linseed oil being present in the mixture in the ratio of about twenty-four parts cement to about fourteen parts oil, and said cement being maintained in suspension in said mixture by the presence of a relatively small amount of magnesium carbonate intimately dispersed throughout the mixture.

2. A paint composition comprising an intimate mixture of Portland cement, linseed oil, a suspension medium consisting of magnesium carbonate, and at least one of the group consisting of diatomaceous earth and zinc oxide, the solids, excluding the magnesium carbonate, and oil being present in the mixture in the ratio of about twenty-four parts solids to fourteen parts oil, and said cement being maintained in suspension in said mixture by the presence of a relatively small amount of magnesium carbonate intimately dispersed throughout the mixture.

3. A paint composition comprising an intimate mixture of Portland cement, linseed oil, a colouring pigment, and a suspension medium consisting of magnesium carbonate, said Portland cement and linseed oil being present in the mixture in the ratio of about twenty-four parts cement to about fourteen parts oil, and said cement being maintained in suspension in said mixture by the presence of a relatively small amount of magnesium carbonate intimately dispersed throughout the mixture.

4. A paint composition comprising an intimate mixture of Portland cement, linseed oil, bitumen, and a suspension medium consisting of magnesium carbonate, said Portland cement and bitumen and linseed oil being present in the mixture in the ratio of about twenty-four parts of cement and bitumen to about twelve parts of oil, and said cement being maintained in suspension in said mixture by the presence of a relatively small amount of magnesium carbonate intimately dispersed throughout the mixture.

5. A paint composition comprising an intimate mixture of Portland cement, linseed oil, water and a suspension medium consisting of magnesium carbonate, said Portland cement and linseed oil being present in the mixture in the ratio of about twenty-four parts of cement to about fourteen parts of oil, and said water being present in amount not exceeding 25% of the volume of the oil, and said cement being maintained in suspension in said mixture by the presence of a relatively small amount of magnesium carbonate intimately dispersed throughout the solution.

LESLIE JAMES HOWLETT.
WESLEY HENRY HOWLETT.